20 United States Patent Office 2,747,839
Patented May 29, 1956

2,747,839

METHOD FOR CORRECTING LOST CIRCULATION OF DRILLING FLUIDS

Fitzhugh L. Moore, Odessa, Tex., assignor, by mesne assignments, to Socony Mobil Oil Company, Inc., a corporation of New York No Drawing. Application April 30, 1951,
Serial No. 223,819

2 Claims. (Cl. 255—1.8)

This invention relates to the drilling of wells and relates more particularly to a method for correcting lost circulation of drilling fluid in the drilling of wells.

In the rotary drilling of wells, such as those for petroleum oil or gas, a drilling fluid is continuously circulated from the surface of the ground to the bottom of the well bore and back to the surface again for the purpose of lubricating the drill bit and pipe, carrying cuttings from the bottom of the well bore to the surface of the ground, and imposing a hydrostatic pressure on the drilled formations to prevent escape of oil, gas, or water therefrom into the well bore during the drilling operations. Various types of drilling fluids are employed and these drilling fluids may be broadly classified as water base drilling fluids, oil base drilling fluids, and oil-water emulsion drilling fluids. Each of these broad classes include drilling fluids of different characteristics or different compositions and the selection of any particular drilling fluid involves various considerations such as the type of formation being drilled, the formation pressure, cost, etc.

When drilling through fractured or cavernous formations or other formations having high permeability, a condition known as lost circulation is frequently encountered, i. e., the drilling fluid flows into the formation with consequent loss of the drilling fluid and increase in the cost of drilling the well. Frequently, the condition is so aggravated that drilling cannot be continued and the well has to be abandoned. Various methods have been devised to correct lost circulation but each suffers from one or more drawbacks. For example, various types of fibrous materials have been added to the drilling fluid to correct lost circulation but these materials form a loosely adherent barrier along the walls of the well bore at the lost circulation zone which, while correcting the lost circulation momentarily, are easily removed by the normal mechanical action of the drill bit or pipe or by the normal erosive effect of the drilling fluid stream with recurrence of lost circulation.

It is an object of this invention to provide a method for correcting lost circulation of drilling fluid. It is another object of this invention to provide a barrier to the flow of drilling fluid into a lost circulation zone, which barrier is not easily removable by the normal action of the drill bit or pipe or the normal erosive effect of the drilling fluid stream. It is another object of this invention to provide a lost circulation correction method applicable in connection with any type of drilling fluid. Further objects of the invention will become apparent from the following description thereof.

In accordance with the invention, lost circulation of drilling fluid to a lost circulation zone is corrected by a sequence of steps comprising passing water to the lost circulation zone if the lost circulation zone does not already contain water and passing oil containing an agent which will assist in the stabilization of an emulsion and passing a suspension of shredded or ground leather to the lost circulation zone.

By the process of the invention, effective correction of lost circulation is obtained. A barrier is imposed within the lost circulation zone that effectively reduces or completely prevents further ingress of drilling fluid to the lost circulation zone and normal action of the drill bit or pipe or flow of the drilling fluid stream does not remove the barrier. While I do not wish my invention to be limited to the consequences of any theory, it is believed that the oil containing the agent which will assist in the stabilization of an emulsion entering the lost circulation zone, upon admixture with the water therein, will form an emulsion in situ, which emulsion adheres to the walls of the voids or interstices of the formation or formations constituting the lost circulation zone and the shredded or ground leather deposits on and adheres to the emulsion to form a substantially continuous and impervious barrier within the lost circulation zone.

The permeable formation or formations constituting the lost circulation zone may contain water which may be the natural water of the formation or may be water from aqueous drilling fluid which has invaded the formation. In these cases, it will not be necessary to pass water to the formation or formations constituting the lost circulation zone. However, it is preferred to first pass water to the lost circulation zone to insure its presence therein.

Where water is passed to the lost circulation zone as a first step, the amount employed, since the purpose of the water is to form an emulsion with the oil, need only be sufficient to fill up the interstices of the lost circulation zone to the surface therein where the barrier will form. The amount necessary for this purpose will, of course, vary in each case and will depend upon the thickness, the permeability, and the porosity of the lost circulation zone. Ordinarily, the thickness, the permeability, and the porosity of the lost circulation zone cannot be determined and therefore no definite rule can be given with respect to the amount of water to be employed. However, since water is relatively inexpensive, sufficiently large quantities to insure filling up the interstices of the lost circulation zone to any depth desired can always be employed. The water employed may be fresh water or may be salt water, whichever is available or desired.

Immediately following passage of the water to the lost circulation zone, oil containing an agent which will assist in the stabilization of an emulsion is passed to the lost circulation zone. The oil to be employed may be any type of oil heretofore employed in connection with the drilling of wells. Suitable oils include fuel oil, crude oil, diesel oil, kerosene, stove oil, gas oil, coal tar, etc. It is essential that the oil contain an agent which will assist in the stabilization of an emusion admixed therewith and any suitable type of agent may be employed. Suitable types of agents include blown asphalt, Turkey-red oil, sulfuric acid, soaps of lignosulfonic acids, soaps of tall oil, soaps of fatty acids, and emulsoid colloids such as starch or sodium alginate. The amount of agent to be mixed with the oil will be the amount required to stabilize an oil-water emulsion. These amounts will vary depending upon the type of oil and the type of agent employed. However, the amounts of any particular type of agent required to stabilize an emulsion of any particular type of oil are well known to those skilled in the art and, in addition, are determinable by admixing water with samples of oil containing increasing amounts of agent and noting the amount of agent required to obtain the desired degree of stabilization.

The use of an oil containing blown asphalt as the agent which will assist in stabilization of an emulsion is desirable inasmuch as admixture of the oil containing the blown asphalt with water in the permeable formation results in precipitation or flocculation of the blown asphalt and the particles of the precipitated blown asphalt adhere along with the emulsion to the walls of the voids or the interstices of the formation to provide a matting upon which the shredded leather can more readily adhere. Where blown asphalt is employed, it should be employed in amount of at least five per cent by weight of the oil in order to provide sufficient material for precipitation and for assisting in stabilization of the emulsion. The blown asphalt may be prepared by any suitable procedure known to the art, as, for example, by blowing air through asphalt at an elevated temperature, and may be compounded with the oil by any suitable procedure known to the art as, for example, by mixing in the molted state with the oil.

While blown asphalt is capable of assisting in stabilization of an emulsion, it is not as effective an agent for stabilization of an emulsion as other agents such as those mentioned hereinabove. Accordingly, where blown asphalt is employed, it is preferred to admix with the oil containing the blown asphalt a second agent capable of assisting in the stabilization of an emulsion. Any suitable agent may be employed, such as those known as emulsifying agents. Suitable agents include Turkey-red oil, sulfuric acid, soaps of lignosulfonic acids, soaps of tall oil, soaps of fatty acids, and emulsoid colloids such as starch or sodium alginate.

The oil employed must be free of any appreciable amount of water emulsified therewith in order that emulsification occur in the formation or formations constituting the lost circulation zone. However, since the oil may be passed to the lost circulation zone through the well bore immediately following passage of water, or water or aqueous suspension may be passed through the well bore following passage of the oil, the oil passing through the well bore may have water emulsified therewith at the interface between the oil and the water or aqueous suspension. This emulsion may intermix from the interface through the body of oil to some extent but will not be sufficient to seriously affect correction of lost circulation. Accordingly, the formation of an emulsion prior to entry of the oil into the formation or formations constituting the lost circulation zone cannot always be prevented and since the presence of this small amount of emulsion does not seriously affect correction of lost circulation, the presence of a small amount of water in the oil prior to passage to the well bore will likewise not seriously affect correction of lost circulation. Thus, it is not essential that the oil originally passed to the well bore be entirely free of water. It is preferred, however, that the oil passed to the well bore contain as little free water as possible in order that the extent of emulsification prior to entry of the oil into the formation or formations be at a minimum.

The amount of oil to be passed to the lost circulation zone should be sufficient to provide emulsion to fill up the interstices of the lost circulation zone to a surface therein where the barrier will form. This amount, similarly to the amount of water to be employed, will depend upon the thickness, the permeability, and porosity of the lost circulation zone, and since the thickness, the permeability, and the porosity of the lost circulation zone cannot be determined, no definite rule can be given with respect to the amount of oil to be employed. However, it has been found that in a case where the lost circulation was about 80 barrels of drilling fluid per hour, correction of lost returns was obtained by the method of the invention employing about seven barrels of oil.

Shredded or ground leather in suspension is also passed to the lost circulation zone. The shredded leather may be passed to the lost circulation zone in admixture with the oil containing the agent which will assist in stabilization of an emulsion or may be passed to the lost circulation zone after the oil has entered the lost circulation zone. In the latter case, the suspension passed to the lost circulation zone may be prepared by adding the shredded leather to water, drilling fluid, oil, or any other suitable fluid.

The leather may be any type of tanned animal skin and may be tanned by any suitable process such as vegetable tanning or chrome tanning. The leather must be shredded or ground and the larger portion of shreds or fibers should be hair-like in form and at least the finer shreds, when pressed together in the dry state, should tend to mat or form a felt-like material. The shredded leather may be prepared by grinding leather against abrasive wheels, between millstones, or by any other method providing a fibrous, shredded material.

The shredded leather tends to lump together when added to the fluid employed for preparing the suspension and therefore it is preferred to add the shredded leather to the fluid by sprinkling or scattering or otherwise in small individual quantities in order to obtain a relatively uniform suspension. Suitably, the shredded leather may be added to the fluid from a hopper provided with a liquid jet to remove the leather therefrom. Where the shredded leather is added in large individual quantities to the fluid, as, for example, by dumping into drilling fluid in the mud pit, and lumping occurs, agitation of the fluid is helpful in obtaining uniform dispersion.

The amount of shredded leather to be employed will, as in the case of the water and the oil containing an emulsifying agent, vary in each individual case depending upon the thickness, the permeability, and the porosity of the lost circulation zone and no definite rule can be given with respect to the amount to be employed. However, in cases of lost circulation of about 80 barrels per hour, correction has been obtained by the process of the invention employing 100 to 500 pounds of shredded leather. The amount of shredded leather in the suspension may vary although generally between about two and twenty pounds of shredded leather per barrel of suspension has been found to give satisfactory results. However, larger amounts of shredded leather per barrel of suspension may be found desirable.

The following examples will be illustrative of the invention.

*Example I*

In the drilling of an oil well, lost circulation was sufficiently excessive to render the use of clay suspensions or other prepared drilling fluids uneconomical, and water alone was employed as the drilling fluid. At a depth of 7700 feet, the lost circulation was 80 barrels per hour. At this depth, the lost circulation zone being filled with the water employed as the drilling fluid, seven barrels of diesel oil containing blown asphalt in an amount of about 15% by weight and sodium soap of tall oil as an emulsifying agent in an amount of about 4% by weight were pumped through the drill pipe to the lost circulation zone. Immediately following the oil, a suspension of water and shredded leather comprising 400 pounds of shredded leather suspended in 40 barrels of water, were pumped through the drill pipe to the lost circulation zone. Lost circulation was completely corrected by this treatment.

*Example II*

At 8700 feet in the same well, the lost circulation was 15 barrels per hour. The lost circulation zone being filled with water, three barrels of the same oil described in Example I were pumped through the drill pipe to the lost circulation zone followed immediately by 400 pounds of shredded leather suspended in 40 barrels of water. Lost circulation was immediately and completely corrected.

Having thus described my invention, it will be understood that such description has been given by way of illustration and example and not by way of limitation, reference for the latter purpose being had to the appended claims.

I claim:
1. In the process of drilling a well bore in the ground wherein a drilling fluid is pumped from the surface of the ground through said well bore and thence back to the surface of the ground and lost circulation of said drilling fluid is encountered by reason of said drilling fluid entering a lost circulation zone within said well bore, said lost circulation zone containing water, the improvement in correcting lost circulation of said drilling fluid comprising discontinuing pumping of said drilling fluid from the surface of the ground through said well bore, pumping into said well bore to contact said lost circulation zone oil containing a first agent which will assist in stabilization of an emulsion and also containing a second agent which will assist in stabilization of an emulsion, said second agent consisting of blown asphalt, whereby said oil will admix with said water in said lost circulation zone and form an emulsion therein and said blown asphalt will flocculate, which emulsion will adhere to the walls of the interstices of said lost circulation zone and which flocculated blown asphalt will adhere with the emulsion to the walls of the interstices of said lost circulation zone to form a matting therein, thereafter pumping into said well bore to contact said lost circulation zone a suspension of shredded leather in a liquid whereby said shredded leather will adhere to said matting within said lost circulation zone to form within said lost circulation zone a barrier to the entry of drilling fluid, and thereafter pumping drilling fluid from the surface of the ground through said well bore.

2. In the process of drilling a well bore in the ground wherein a drilling fluid is pumped from the surface of the ground through said well bore and thence back to the surface of the ground and lost circulation of said drilling fluid is encountered by reason of said drilling fluid entering a lost circulation zone within said well bore, the improvement in correcting lost circulation of said drilling fluid comprising discontinuing pumping of said drilling fluid from the surface of the ground through said well bore, pumping water into said well bore to contact and enter said lost circulation zone, thereafter pumping into said well bore to contact said lost circulation zone oil containing a first agent which will assist in stabilization of an emulsion and also containing a second agent which will assist in stabilization of an emulsion, said second agent consisting of blown asphalt, whereby said oil will admix with said water in said lost circulation zone and form an emulsion therein and said blown asphalt will flocculate, which emulsion will adhere to the walls of the interstices of said lost circulation zone and which flocculated blown asphalt will adhere with the emulsion to the walls of the interstices of said lost circulation zone to form a matting therein, thereafter pumping into said well bore to contact said lost circulation zone a suspension of shredded leather in a liquid whereby said shredded leather will adhere to said matting within said lost circulation zone to form within said lost circulation zone a barrier to the entry of drilling fluid, and thereafter pumping drilling fluid from the surface of the ground through said well bore.

References Cited in the file of this patent

UNITED STATES PATENTS

| | | |
|---|---|---|
| 2,064,936 | McQuiston | Dec. 22, 1936 |
| 2,099,825 | Rolshausen | Nov. 23, 1937 |
| 2,297,660 | Mazee | Sept. 29, 1942 |
| 2,555,794 | Henkes | June 5, 1951 |
| 2,599,752 | Fischer | June 10, 1952 |
| 2,634,236 | Simon et al. | Apr. 7, 1953 |

OTHER REFERENCES

"Lost Circulation Materials and Mud Additives," The Oil and Gas Journal, December 28, 1950, pp. 64, 66 and 67.

"Composition and Properties of Oil Well Drilling Fluids," Roers, 1948, p. 392.

"Composition and Properties of Oil Well Drilling Fluids," Roers, 1948, pp. 449–450.